P. EVANS, A. C. ROWLEY AND C. B. GARRETT.
DRY PIPE VALVE.
APPLICATION FILED MAR. 1, 1919.

1,334,847.

Patented Mar. 23, 1920.
4 SHEETS—SHEET 1.

Inventors.
Powell Evans,
Arthur C. Rowley,
Charles B. Garrett,
by their Attorneys.
Howson & Howson P. EVANS, A. C. ROWLEY AND C. B. GARRETT.
DRY PIPE VALVE.
APPLICATION FILED MAR. 1, 1919.

1,334,847.   Patented Mar. 23, 1920.
4 SHEETS—SHEET 3.

Inventors.
Powell Evans
Arthur C. Rowley,
Charles B. Garrett
by their Attorneys

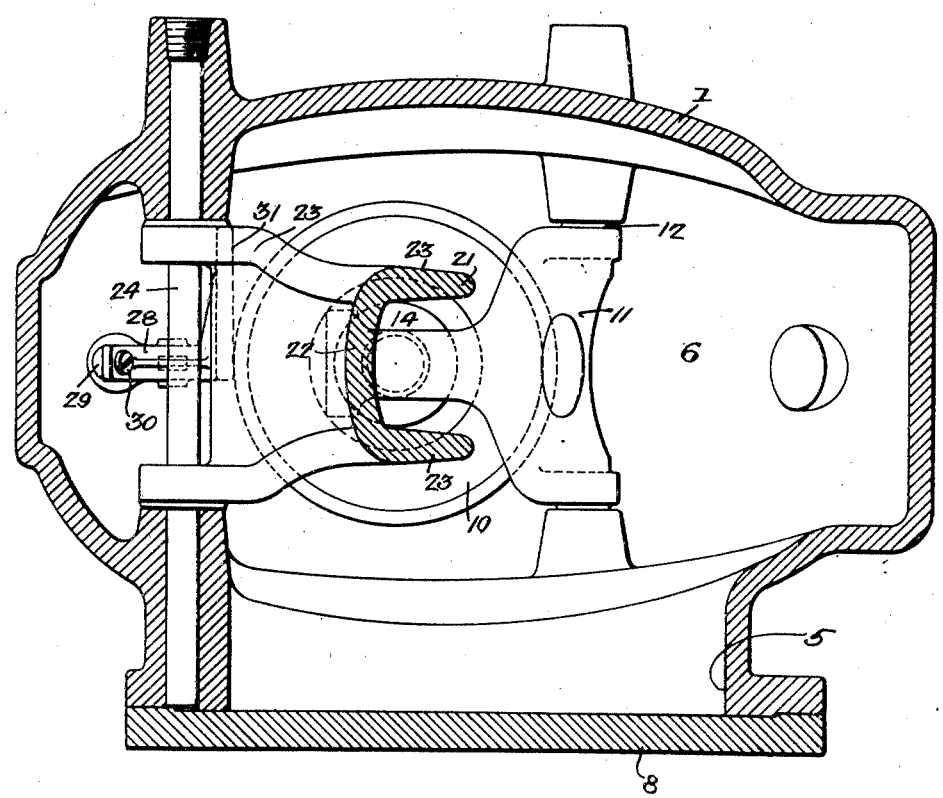
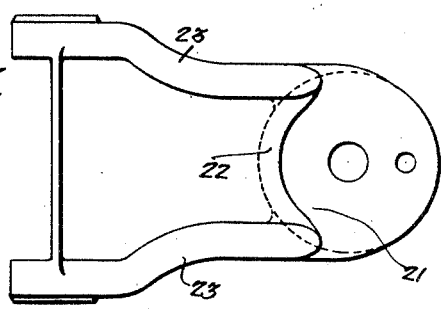

UNITED STATES PATENT OFFICE.

POWELL EVANS, ARTHUR C. ROWLEY, AND CHARLES B. GARRETT, OF PHILADELPHIA, PENNSYLVANIA, ASSIGNORS TO GLOBE AUTOMATIC SPRINKLER COMPANY, OF PHILADELPHIA, PENNSYLVANIA, A CORPORATION OF PENNSYLVANIA.

DRY-PIPE VALVE.

1,334,847.       Specification of Letters Patent.       Patented Mar. 23, 1920.

Application filed March 1, 1919. Serial No. 280,097.

*To all whom it may concern:*

Be it known that we, POWELL EVANS, ARTHUR C. ROWLEY, and CHARLES B. GARRETT, citizens of the United States, residing in Philadelphia, Pennsylvania, have invented Dry-Pipe Valves, of which the following is a specification.

One object of our invention is to provide a relatively simple, compact and substantial form of differential dry pipe valve in which the parts shall be so arranged as to permit of a direct or straight line flow of water through the valve casing under the predetermined conditions governing its operation;—the arrangement of parts being such as to permit of the convenient and inexpensive manufacture of the apparatus.

It is further desired to provide a dry pipe valve of the type above indicated with a novel arrangement and mounting of parts whereby, as long as the air and water valves remain closed, any liquid entering the chamber between said valves is permitted to escape, but when said valves are open so as to permit a flow of liquid through the valve casing, the otherwise open drainage passage is automatically closed.

We further desire to provide a differential dry pipe valve in which the two movable valve elements directly engage each other under normal conditions during which flow of liquid is prevented, for which purpose the air valve is constructed and mounted in a novel manner relatively to its seat and to the water valve;—the invention further contemplating the provision of an automatic drainage valve controlled by said air valve.

These objects and other advantageous ends we attain as hereinafter set forth, reference being had to the accompanying drawings, in which, Figures 1 and 2 are vertical longitudinal sections of a dry pipe valve constructed according to our invention; showing its movable elements in the positions occupied under normal and under operating conditions, respectively;

Figs. 3 and 4 are respectively transverse sections on the lines 3—3 and 4—4, Fig. 1;

Fig. 5 is an inverted plan of the supporting arm for the air valve; and

Figure 1:
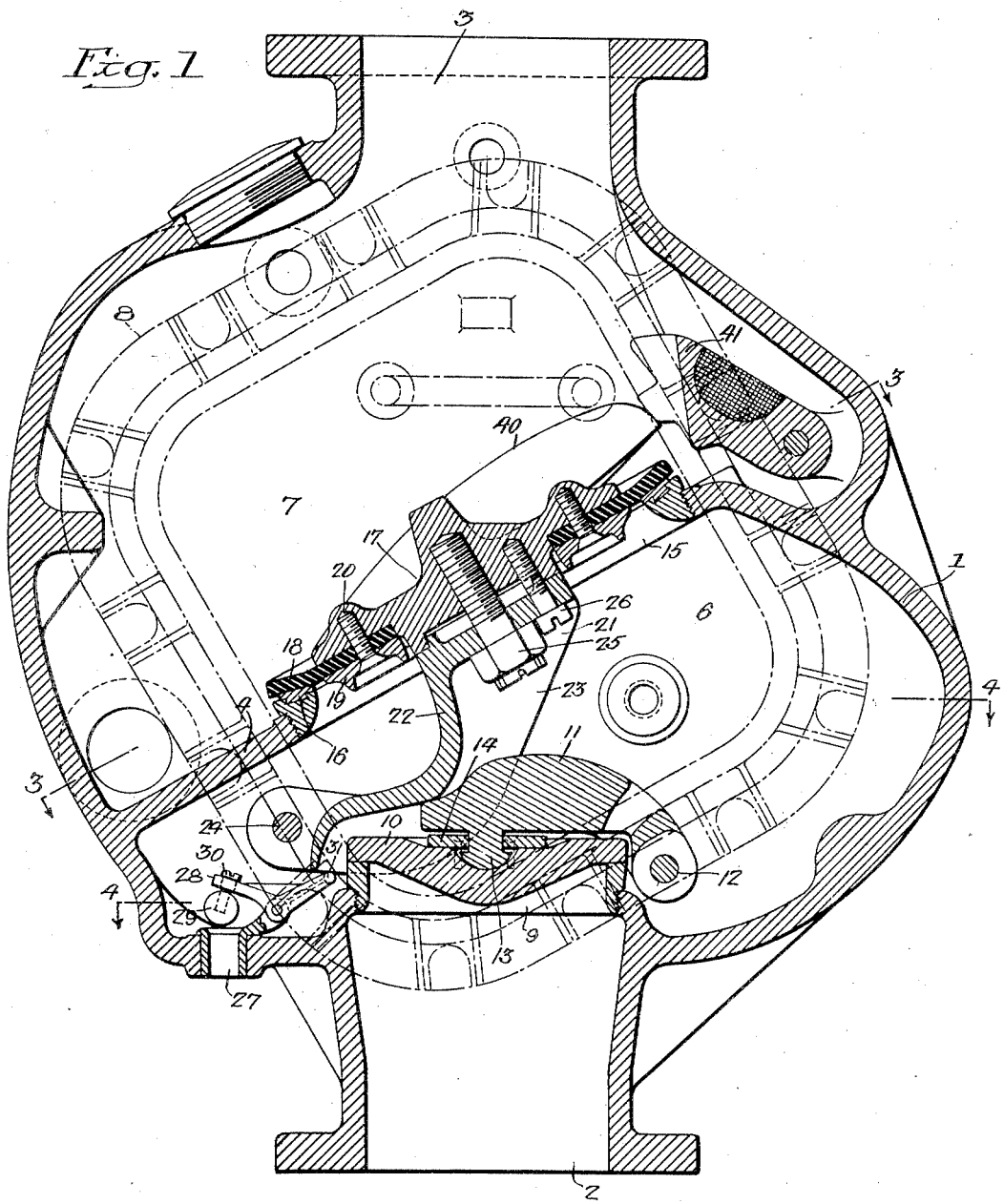

In the above drawings, 1 represents a valve casing having a bottom inlet 2 and a top outlet 3 axially in line with each other, in addition to which said casing is provided with a transverse partition 4 lying in a plane inclined at an acute angle to the horizontal plane and having in it a circular opening whose center lies in the axial line forming the inlet 2 and outlet 3. One side of the casing 1 is provided with a relatively large opening 5 entering both of the chambers 6 and 7 on opposite sides of the partition 4 and this is normally closed by a plate 8 held in position by bolts or other suitable means.

The opening from the inlet 2 into the chamber 6 has mounted in it a valve seat 9 designed to coöperate with a valve 10 fixed to a forked structure 11 whose arms are pivotally mounted upon a transversely extending pivot bar or rod 12. Said structure includes a transverse web from which a rounded head 13 projects into a correspondingly formed cavity in the water valve 10 where it is retained by a ring or annular plate 14 so as to permit of a slight universal movement of the valve.

The casing 1 is so formed that while the valve 10 may rest upon the seat 9 to close the inlet into the chamber 6, it is free to swing with the structure 11, back on its supporting pivot pin 12 so that it lies wholly to one side of the inlet passage 2.

The opening in the partition 4 has mounted in it a valve seat 15 having a soft metal face 16 within the chamber 7 designed to coöperate with an air valve 17. The circular body of this latter has a rubber or other radially projecting ring 18 clamped to it by a retaining ring 19 in such manner as to engage the face 16 of the valve seat 15 when the valve is closed and this retaining ring is held to the body of the valve by a suitable number of screws 20. The valve itself is rigidly mounted on a structure 21 having a pair of side arms 23 connected by a transverse body 22 and pivotally connected to the valve casing by a pivot pin or bar 24 within the chamber 6.

The body 22 is conveniently connected to the air valve 17 by a bolt 25 extending centrally into the latter which is held from turning relatively to said body by a screw or bolt 26 at one side of said central or main bolt. The body 22 of the structure 21 is so formed that when the water valve 10 and air valve 17 are in their closed positions, resting upon their respective seats, it engages the forked structure 11 on which said water valve is mounted, so that the latter is held from opening as long as the air valve remains closed. It is noted that while the head 13 of the forked structure 11 is rounded or curved so as to permit a slight relative movement of the water valve 10 such as may be necessary to permit it to properly engage its seat 9, it is in effect a part of said water valve, and similarly the forked structure 22, being rigidly connected to the air valve 17, constitutes in effect a part thereof.

At the lowest point of the chamber 6 is provided a drainage opening having mounted therein a bushing or tubular structure 27 providing a valve seat within said chamber and including an extension to which is pivoted a lever 28. The latter at one end carries a valve in the form of a ball 29 more or less loosely connected to it by a screw 30 and at its opposite end is provided with a laterally extended portion 31 of such length as to be engaged by one of the arms 23 of the forked structure 22 when the valve 17 is seated. When so engaged the lever 28 is held in such position that the valve 29 is elevated above the seat structure 27 so that any liquid in the casing 6 may escape therethrough. When however the valve 17 becomes unseated, its web 23 releases the lever 28 and allows the valve 29 to seat itself on the inner end of the bushing 27 so as to prevent further escape of liquid.

Figure 2:
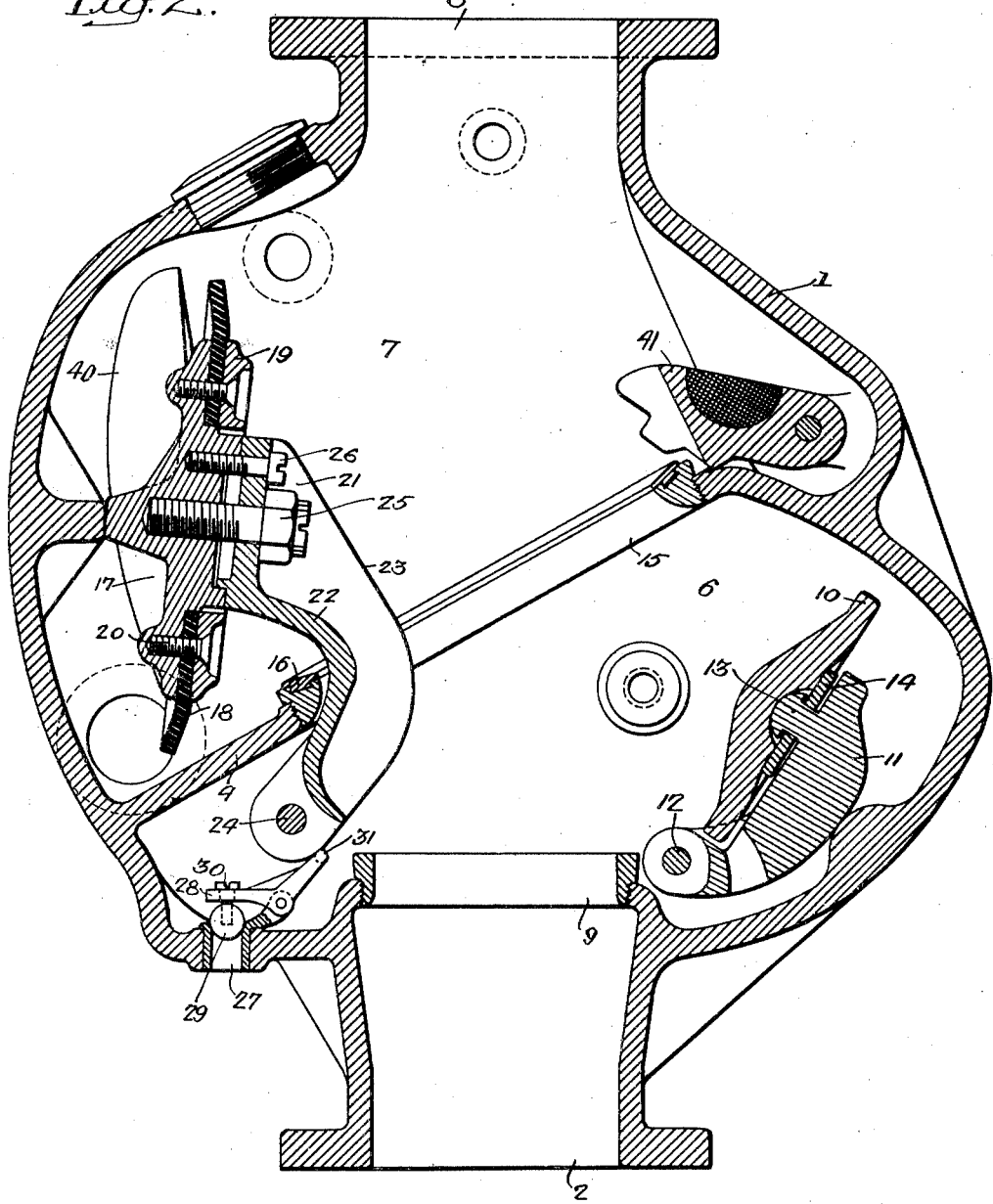
Figure 3:
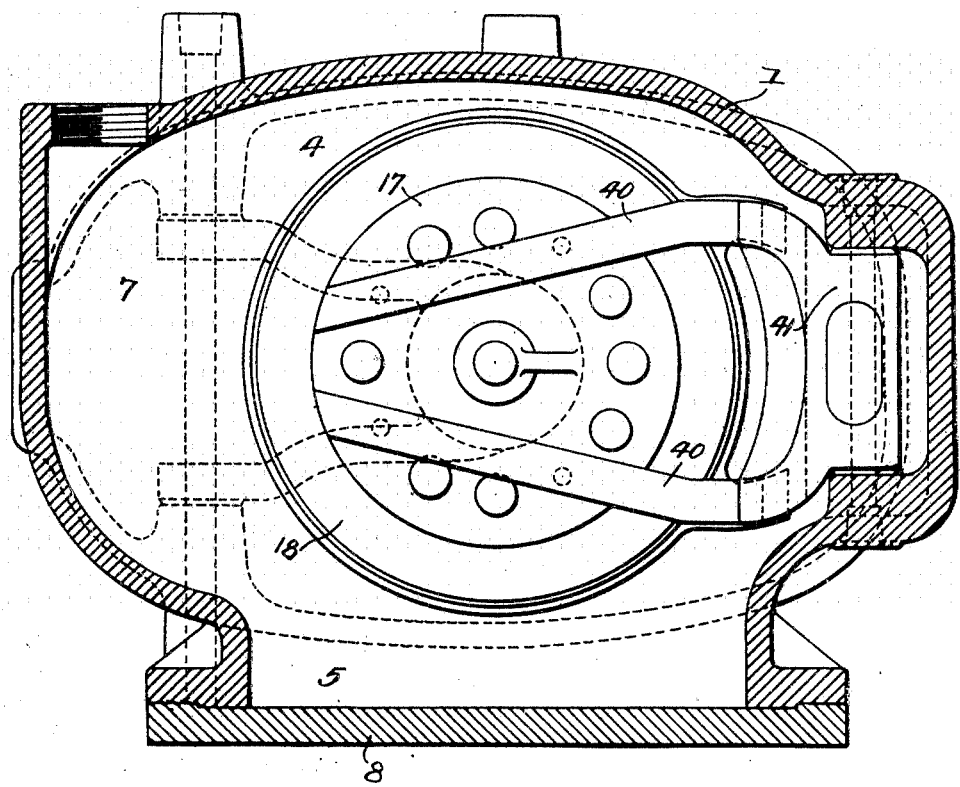
Figure 6:
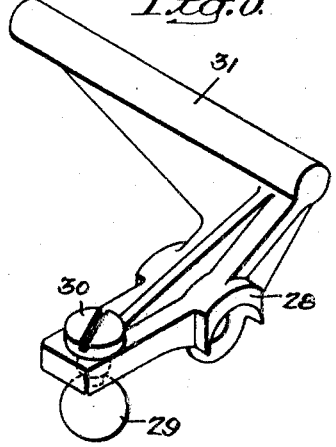
Fig. 6 is a perspective view of the automatic drain-controlling valve with its associated parts.

Under conditions of use the inlet 2 is connected to a source of water under pressure and the chamber 7 is connected through the outlet 3 to a sprinkler system containing air maintained under a pressure less than that of the water. The area of the valve 10 exposed to water pressure in the inlet bears such a ratio to the area of the valve 17 exposed to the air pressure as will with the mechanically exerted leverages, predicate a tripping of the device, upon such unbalancing of the forces when, in the case illustrated, the air pressure falls below one sixth of the water pressure. Under normal conditions therefore the air pressure is sufficient to hold the air valve closed and through its structure 22 in engagement with the body 11, holds the water valve 10 closed. When however by reason of the opening of one or more sprinkler heads of the system connected to the outlet 3, there is a substantial drop of the air pressure in the chamber 7, the valve 17 is raised from its seat by the water pressure on the valve 10 and is swung back on its pivot rod or pin 24 to one side of the straight passage through the openings in the partition and the inlet and outlet, for which purpose the main part of its structure 22—23 swings through the valve seat 16 into the chamber 7 as shown in Fig. 2. Likewise the water valve 10 swings back on its pivot pin 12, while the drainage valve 28 is allowed to automatically close by reason of its release by the arm 23, so that water under pressure is free to flow in a straight line from the inlet 2 through the partition opening and the outlet into the sprinkler system.

When after the valve has thus fulfilled its functions the flow of water through it is stopped, the plate 8 is removed, the valves 10 and 17 are successively returned to their seats and air under pressure is admitted to the sprinkler system and to the chamber 7. Water under pressure is then admitted to the supply line connected to the inlet 2 so that the apparatus is again ready for action;—the drainage valve 28 being also held open as above noted by the valve 17, so that any water leaking into the chamber 6 will be permitted to flow out through the bushing 27.

The body of the valve 17 in the chamber 7 is preferably formed with two outwardly projecting ribs or webs 40 having ends extended beyond its edge to respectively cooperate with the suitably placed branches of a latch 41 pivotally mounted at one side of the chamber 7, so that under the action of gravity it normally rests upon said ribs, which with the valve 17 and its ring 18, may move a short distance away from the seat ring 16 under the action of such changes of the pressure on the water valve 10 as might be caused by water hammer, without being affected by said latch. When however, there is such a reduction of air pressure in the chamber 7 as permits the valve 17 to rise beyond a predetermined distance from its seat, the latch 41 falls under the ribs 40 and prevents said valve reseating, whereupon the flow of water into the chamber 1 through the partially open valve 10 shortly acts on the valve 17 and swings it open.

We claim:

1. The combination in a differential dry pipe valve of a casing having a transverse partition dividing it into chambers and provided with an inlet and outlet axially in line with an opening in said partition; with two valves both pivoted in one of the chambers in positions to control the flow of water through the inlet and through the partition opening respectively, said valves having portions in direct engagement when in their closed positions.

2. The combination in a differential dry pipe valve of a casing having a transverse partition dividing it into two chambers, and provided with an inlet and an outlet axially in line with an inclined opening in said partition; with two valves formed to have different effective areas and provided with pivots in one of the chambers supporting them in positions to control the flow of water through the inlet and through the partition opening respectively, said valves having portions in direct engagement when in their closed positions.

3. The combination in a differential dry pipe valve of a casing having a transverse partition dividing it into chambers and provided with an inlet, an outlet and an opening in the partition, all in axial alinement; a valve pivoted in the chamber between the partition and the inlet for controlling the flow of water through the inlet; with a second valve having a rigidly connected arm also pivoted in said chamber and having a portion directly operative on the first valve to hold it closed.

4. The combination in a differential dry pipe valve of a casing having a transverse partition, dividing it into two chambers and provided with an inlet and an outlet axially in line with an opening in said partition; a valve operative in one of the chambers for closing said partition opening and having rigidly connected to it a structure pivotally mounted in the other chamber; with a second valve pivotally mounted in the latter chamber and including a relatively adjustable portion directly engaged by said rigidly connected structure of the first valve whereby it is normally retained in a closed position as long as the said first valve remains closed.

5. The combination in a differential dry pipe valve of a casing having a transverse partition dividing it into two chambers and provided with an inlet and an outlet axially in line with an opening in said partition; a valve operative in one of the chambers for closing said partition opening and having rigidly connected to it a structure pivotally mounted in the other chamber; with a second valve pivotally mounted in the latter chamber and including a portion directly engaged by said supporting structure of the first valve whereby it is normally retained in a closed position as long as the first valve remains closed.

6. The combination in a differential dry pipe valve of a casing having a transverse partition dividing it into two chambers and provided with an inlet and an outlet axially in line with an opening in said partition; a valve operative in one of the chambers for closing said partition opening and having rigidly connected to it a structure pivotally mounted in the other chamber; a second valve pivotally mounted in the latter chamber and including a portion directly engaged by said supporting structure of the first valve whereby it is normally retained in a closed position as long as the first valve remains closed; with an automatically acting drainage valve in the second chamber normally held open by one of said other valves.

7. The combination in a differential dry pipe valve of a casing having an inlet and an outlet; a transverse partition for the casing having an opening in line with said inlet and outlet; a valve having a peripheral portion formed to yieldingly engage the marginal portions of the opening in the partition and operative in one of the chambers of the casing formed thereby, said valve including a rigidly connected structure extending into and pivotally mounted in the other chamber; with a valve for the inlet having movably connected to it a structure also pivotally mounted in the second chamber and normally in direct engagement with the supporting structure of the first valve.

8. The combination in a differential dry pipe valve of a casing having an inlet and an outlet; a transverse partition having an opening in line with said inlet and outlet; a valve having its peripheral portion formed to engage the marginal portions of the opening in the partition and operative in one of the chambers of the casing formed by said partition, said valve including a rigidly connected structure extending into and pivotally mounted in the other chamber; a valve for the inlet; a structure movably connected to the inlet valve also pivotally mounted in the second chamber and normally in direct engagement with the supporting structure of the first valve, the seats for said two valves lying in planes at an acute angle to each other.

9. The combination in a differential dry pipe valve of a casing having an inlet and an outlet; a transverse partition having an opening in line with said inlet and outlet; valves mounted to normally close the inlet and the opening in the partition respectively and both supported in one of the chambers of the casing formed by said partition, one of the valves having a pair of ribs on opposite sides of one face; with a gravity latch including portions engaging said ribs respectively and formed to prevent reseating of said valve after it has risen a predetermined distance from its seat.

In witness whereof we affix our signatures.

POWELL EVANS.
ARTHUR C. ROWLEY.
CHARLES B. GARRETT.